Nov. 30, 1926.
H. R. RYDER
1,608,865
CONDIMENT HOLDER
Filed May 19, 1925
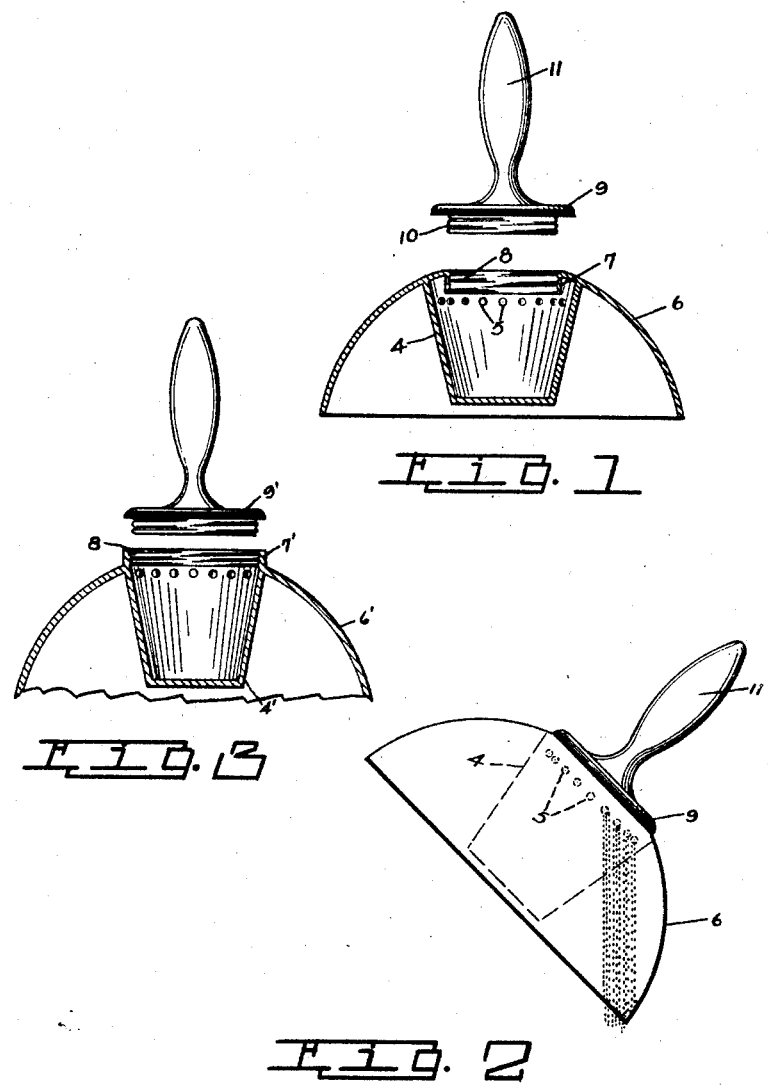
Inventor
H. R. RYDER.
By Bernard F. Garvey
Attorney Patented Nov. 30, 1926.

1,608,865

UNITED STATES PATENT OFFICE.

HARRY R. RYDER, OF ST. PETERSBURG, FLORIDA.

CONDIMENT HOLDER.

Application filed May 19, 1925. Serial No. 31,325.

The present invention relates to a condiment holder.

An object of the invention is to provide a holder which is especially adapted for containing salt and to retain the latter free from moisture and contamination.

Another object of the invention is to provide a holder which will effect an easy and accurate distribution of the condiment without the necessity of subjecting the holder to a shaking action.

A further object of the invention is to provide a condiment holder which is equipped with a closure formed to provide a handle so that the holder can be conveniently grasped by the hand and the contents dispensed in a facile manner.

Other objects of the invention will be apparent from the following description of the present preferred forms of the invention taken in connection with the accompanying drawings wherein:—

Fig. 1 is a vertical sectional view of a condiment holder constructed in accordance with this invention showing the combination closure and handle therefor in side elevation;

Fig. 2 is a side elevational view of a condiment holder constructed in accordance with the present invention illustrating the application of the holder; and Fig. 3 is a detail fragmentary sectional view of a modified form of holder.

The device of the present invention consists of a condiment receptacle 4 which is preferably of tapered configuration, as shown in the drawings, and is provided near its upper end with a row of apertures 5. In the form of invention shown in Fig. 1 the upper marginal edge of the receptacle merges into the inner face of a substantially semi-spherical baffle or apron 6, the latter being provided with a central opening the wall of which is bent inwardly at right angles to provide a neck 7 which is screwthreaded as indicated at 8. The bottom of the receptacle 5 falls short of the lower margin or base of the baffle 6 so that when the baffle is placed on a table or other support a seal is provided which will prevent the entrance of atmosphere or the entrance of extraneous materials through the openings 5 and into the receptacle 4.

The top of the receptacle is closed through the medium of a closure 9 which latter is provided with a depending screwthreaded rim 10 which is threaded into the neck 7 of the baffle. The outer face of the closure 9 issues into a handle 11 which may be conveniently clasped when it is desired to dispense the contents of the receptacle 4.

In the form of invention shown in Fig. 3 of the drawings, the receptacle is indicated at 4' and the baffle at 6'. In this form of the invention, the baffle is provided with a central opening having an upstanding annulus serving as a neck 7' into which the upper end of the receptacle 4' is fitted. The receptacle is provided with screwthreads 8' on its inner periphery and at its upper end for detachable engagement with a closure 9' which is similar in construction to the closure as illustrated in Figs. 1 and 2 of the drawings.

The use of both forms of this invention is the same. When it is desired to dispense the contents of the receptacle the handle of the holder is grasped and the holder tilted and given a slight rotary movement which will permit the condiment to gravitate through the perforations or apertures in the receptacle and pass through into contact with the baffle or apron of the holder. The condiment after contacting with the abutment is distributed in an apparent manner. By tapering the receptacle in the manner illustrated in the drawings, it is apparent that when the holder is tilted the condiment will freely gravitate toward the perforations or apertures in the holder.

It is, of course, to be understood that this device, although described as being adaptable for use as a condiment holder, is susceptible for other uses. Morever, the forms of invention above set forth are merely illustrative of the principle of the device and I am aware that numerous changes may be made in the device in order to produce substantially the same result as that herein set forth. The device may be made of any desired size and constructed of any desired material.

What is claimed is:—

1. A condiment holder including a tapering condiment receptacle provided with a series of openings near one end, and a semispherical baffle formed integral with said receptacle and surrounding said openings.

2. A condiment holder including an open mouthed receptacle with a row of perforations in the upper end thereof, a semi-spherical baffle carried by said receptacle and surrounding the perforations, a closure and handhold mounted in the mouth of said receptacle and a handle on said closure to facilitate rotation of the latter for dispensing its contents against the baffle.

HARRY R. RYDER.

Certificate of Correction.

It is hereby certified that in Letters Patent No. 1,608,865, granted November 30, 1926, upon the application of Harry R. Ryder, of St. Petersburg, Florida, for an improvement in "Condiment Holders," an error appears in the printed specification requiring correction as follows: Page 2, lines 11 and 12, claim 2, strike out the words "and handhold"; and that the said Letters Patent should be read with this correction therein that the same may conform to the record of the case in the Patent Office.

Signed and sealed this 28th day of December, A. D. 1926.

[SEAL.]

M. J. MOORE,
*Acting Commissioner of Patents.*